United States Patent Office 3,285,992
Patented Nov. 15, 1966

3,285,992
POLYESTERAMIDE PREPARED BY REACTING A CARBOXYL CONTAINING COPOLYMER WITH AN ISONITRILE, AND AN ALDEHYDE OR A KETONE
Ivar Ugi and Wulf von Bonin, Leverkusen, Germany, assignors to Farbenfabriken Bayer Aktiengesellschaft, Leverkusen, Germany, a German corporation
No Drawing. Filed Mar. 26, 1963, Ser. No. 267,909
Claims priority, application Germany, Apr. 4, 1962, F 36,466
8 Claims. (Cl. 260—857)

The present invention relates to new high molecular polyester amides having different but valuable properties as plastics as well as a process for preparation of these polyester amides.

It is already known that α-acyloxy-carboxylic acid amides (IVa) may be obtained by combining a carboxylic acid (Ia), a carbonyl compound (IIa) and an isonitrile (IIIa) (M. Passerini, Gazz. chim. ital., 61, 964 (1931)). The so-called Passerini reaction may be represented as follows:

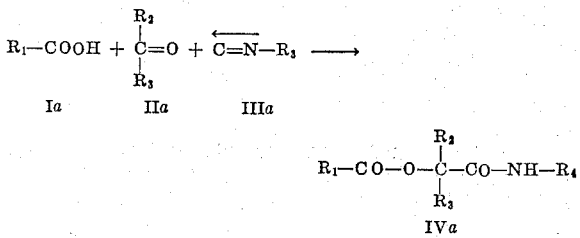

($R_1$–$R_4$ represent organic radicals such as alkyl and aryl radicals but may also represent hydrogen atoms.)

The yields obtained in the Passerini reaction are generally below 80%. The use of this reaction for polyfunctional components to prepare high molecular weight synthetic materials must therefore be regarded as unsuitable. If the reaction does not go to completion, the high molecular compounds produced would have only short chains and may still contain a certain quantity of starting material. High molecular weight substances of this type do not have interesting or valuable properties as synthetic materials. The Passerini reaction does not appear to be suitable for preparing synthetic materials with valuable properties.

It has now been found that high molecular weight polyester amides with plastics properties may be obtained by reacting together a high molecular weight carboxylic acid component, a carbonyl component and an isonitrile component, at least two of these components being bifunctional. Materials with valuable properties may be obtained from this reaction if at least one of the polyfunctional addition components has a molecular weight between 300 and 200,000, preferably between 500 and 4000 and if the molar ratios between the carboxyl group, carbonyl group and isonitrile group deviate less than 50% from the equimolar proportions.

It must be regarded as very surprising that high molecular compounds with valuable properties as synthetic materials are obtained from polyfunctional starting materials even though the reaction is not quantitative in the low molecular weight range. What is particularly surprising is that particularly good properties such as high thermal stability, great resistance to tearing, high tensile strength, high impact strength and great toughness are obtained if at least one of the polyfunctional addition components has a molecular weight between 300 and 200,000 and the molecular ratios between carboxyl group, carbonyl group and isonitrile group deviate by less than 50% from the equimolar ratios.

The high molecular weight carboxylic acid component more specifically is represented by a carboxyl group containing polymer having a molecular weight of between 300 and 200,000, preferably 500–4000, and having a carboxyl group content of from 1 to 20% (by weight), preferably 4–15%.

Typical carboxyl group containing polymers to be used according to the present process are members of the following group:

(1) Copolymers of:
(a) Acrylic acid
(b) Methacrylic acid,
(c) Maleic acid semi esters with copolymerizable (a) monovinyl compounds (such as monovinyl hydrocarbons, monovinylester, monovinyl halides, acrylic acid derivatives)
(b) monovinyliden compounds (such as vinyliden halides, methacrylic acid derivatives)
(c) conjugated aliphatic diolefines having from 4 to 6 carbon atoms, said copolymers having a COOH-group content between 1 and 20%.

(2) Polyesters of:
(a) A saturated aliphatic alcohol having 2–3 OH-groups with
(bI) Saturated aliphatic carboxylic acids having 2–3 COOH-groups or
(bII) Unsaturated aliphatic carboxylic acids having 2–3 COOH-groups or
(bIII) Aromatic, preferably monocyclic carboxylic acids having 2–3 COOH-groups, said polyester having a carboxylic group content between 1 and 20%.

The isonitrile component (=diisocyanide component) to be used represents an at least 7 C-atoms containing isonitrile having at least one, preferably 2–3 —N≡C- group.

Isonitriles of preferred interest are such of the following group:

(1) Monocyclic aromatic diisonitriles, preferably such being substituted with 1–4 C-atoms containing alkyl groups.
(2) Diisonitriles of diphenyl alkanes, preferably of diphenylmethanes and 2,2-diphenylpropanes.
(3) Cycloaliphatic mono- or diisonitriles having 4–6 ring C-atoms.
(4) Diisonitriles of aliphatic, saturated hydrocarbons having 2–10 carbon atoms.

Carbonyl components which are to be used according to the preferred embodiment of this invention are those which correspond to the following general formula

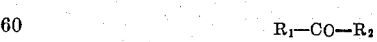

wherein $R_1$ and $R_2$ may represent a hydrogen atom, an alkyl group, a cycloalkyl group, and an aralkyl group or an aryl group, said groups containing between 1–15 carbon atoms and wherein furthermore $R_1$ together with $R_2$ may form a 4-membered, 5-membered or 6-membered carbon ring system. More specifically as carbonyl compounds are intended aldehydes and ketones of the aliphatic, cycloaliphatic, aromatic-aliphatic as well as the aromatic series.

The carbonyl compounds of preferred interest are such of the following group:

(1) Saturated aliphatic aldehydes having from 1–12 carbon atoms and containing 1 or 2 aldehyde groups according to the general definition of our invention.

(2) Monocyclic aromatic aldehydes containing 1 or 2 aldehyde groups according to the general definition of our invention.

(3) Aliphatic saturated monoketones having between 3 and 10 carbon atoms.

(4) Saturated aliphatic-aromatic monoketones having at least 8 carbon atoms.

(5) Aromatic-aromatic monoketones, preferably such containing 2 benzene ring systems.

(6) Cycloaliphatic monoketones having at least 5 and up to 10 carbon atoms.

The course of the reaction of the polyaddition according to the invention may be represented diagrammatically by the following reaction scheme:

$$a. \ U(COOH)_l + b. \ V(C=O)_m + c. \ W(N=C)_n \longrightarrow \text{polyester amide}$$
$$\text{I} \qquad \text{II} \qquad \text{III} \qquad \text{IV}$$

In this reaction scheme U, V, W represent mono-, di- or polyvalent organic radicals, $a$, $b$, $c$ represent the molar quantities of the addition components I–III and $l$, $m$ and $n$ indicate how many functional groups are contained in the molecule.

In an accurately stoichiometrical polyaddition, the ratio of the molar numbers of the reactive groups, namely $(a.l):(b.m):(c.n)$ is 1:1:1. One may deviate from this ratio by up to 50%. The molar ratios between the individual reactive groups therefore may lie between 0.5–1.5:0.5–1.5:0.5–1.5. If $l$ or $m$ or $n$ are considerably greater than 2, particularly if they are greater than 5, excesses greater than 50% of the corresponding polyfunctional components may be used. The functional groups may be present in very large numbers in the molecule, e.g. up to 200. The more functional groups that are present in the molecule, the greater may be the excess. These molar ratios refer in each case to the polyester amide finally obtained.

In principle, at least two of the parameters $l$, $m$, $n$ must be greater than one in the polyaddition according to the invention. Furthermore, it is advantageous but not absolutely necessary for at least one addition component which contains at least two reactive functional groups at the same time to have a molecular weight between 300 and 200,000.

Typical examples of polyesteramides which can be prepared according to the process of this invention correspond to the formulae following below. If for example—in accordance with a preferred embodiment of this invention—a monoaldehyde and a diisonitrile is applied as isonitrile component, polyester amides of Formula V are obtained.

```
V   ⎧       R₁              R₁       ⎫
    ⎨-CO-O- C -CO-NH-A-NH-CO- C -O-CO-⎬
    ⎩       R₂              R₂       ⎭
      xx   ym       zd      ym    xx
```

In this formula indicate:

$R_1$ and $R_2$: a monovalent aliphatic, cycloaliphatic or aromatic hydrocarbon radical or a hydrogen atom
A: the diisonitrile residue without the isonitrile groups
{: the carboxyl group carrying polymer molecule
$xx$: the reacted carboxyl group component
$ym$: the reacted carbonyl group component
$zd$: the reacted diisonitrile component If similarly a dialdehyde is applied in connection with a monoisonitrile, we obtain the following polyester amide types:

```
       ⎧            yd               ⎫
       ⎨         H       H           ⎬
       ⎨-CO-O-  C - B - C  -O-CO-    ⎬
       ⎨        |       |            ⎬
       ⎨        CO      CO           ⎬
       ⎨        |       |            ⎬
       ⎨        NH      NH           ⎬
       ⎨        |       |            ⎬
       ⎩        R       R            ⎭
         xx    zm      zm    xx
```

In this formula indicate:

R: the monoisonitrile residue without isonitrile groups
B: the dialdehyde residue without the aldehyde groups
$xx$: the reacted carboxyl group component
$yd$: the reacted dialdehyde
$zm$: the reacted monoisonitrile These two typical examples demonstrate the new principle of crosslinking carboxyl groups containing polymer claims by the process of this invention. Obviously this crosslinking process is not limited to these two specific types.

A large number of addition components I–III may be used for the process according to the invention.

The following groups of compounds are to be understood as carboxylic acid components (I):

(1) aliphatic, aromatic and heterocyclic mono- and polycarboxylic acids. They may be of low molecular weight but preferably high molecular weight carboxylic acids with a molecular weight between 300 to 200,000 are used.

Examples of such high molecular weight carboxylic acids which may be used include the following: Uniform and mixed polyesters with two or more free carboxyl groups, which may be obtained by the known process from di- and tricarboxylic acids and di- or triols. These polyesters may also contain monofunctional alcohols, monocarboxylic acids, phosphoric acid, polyhydroxyl compounds with more than three hydroxyl groups, amino alcohols and polyisocyanates as structural units. These polyesters may, for example, contain as glycol components: Ethylene glycol, diglycol, octaglycol, polyglycols having molecular weights of 300 to 4000, 1:2- and 1:3-propanediol, monochlorohydrin, polypropylene glycols with molecular weights of 200 to 4000, mixed polyglycols of ethylene- and propylene oxide, 1:3-, 2:3-, 1:4-butanediol, polyethers which may be derived from 1:4-butanediol, 1:6- and 2:5-hexandiol, 1:10-decanediol, 2:2-dimethyl-1:3-propanediol, 3-methyl-2:4-pentadiol, octadecane-9:10-diol-(12), di-p-(-hydroxyethoxyphenyl)-propane-(2:2), dihydroxyethylhydroquinone, dihydroxyethyl-p:p'-dihydroxydiphenylmethane and its alkyl- and halogen derivatives, dihydroxyethyl-m-toluidine, glycerol, 1:2:4-butanediol, trimethylolpropane, 1:2:6-hexanetriol, pentaerythritol, mannitol and cane sugar. In addition, the following mono-functional alcohols may be incorporated in the polyesters: methanol, chlorohydrin, allyl alcohol. As carboxylic acid components of the polyesters, there may be used the above mentioned carboxylic acids as well as, in particular, acetic acid, dichloroacetic acid, acrylic acid, sorbic acid, fatty acids of linseed oil, laevulinic acid, oxylic acid, succinic acid, maleic acid, tetrapropenyl-succinic acid, diglycollic acid, tartaric acid, benzoic acid, 3:4-dichlorobenzoic acid, O-, m- and p-benzenedicarboxylic acids, 1:2:4-benzene-tricarboxylic acids, pyromellitic acid, hexachloro-endomethylene-tetrahydrophthalic acid, polycarboxylic acids which may be obtained by reacting lactones such as butyrolactone with aromatic hydrocarbons such as benzene or naphthalene.

The following are specific examples of polyesters with free carboxyl groups: Polyesters of adipic acid and ethylene glycol with an average molecular weight of 200 to 5000, acid polyesters which have been obtained by ester interchange of linseed oil with trimethylolpropane and benzene-1:1:4-tricarboxylic acid, polyester- and polyether carboxylic acids obtainable from di- or polyols by oxidation or by reaction with cyclic carboxylic acid anhydrides or carboxylic acid polyanhydrides. The following may also be used as polyesters: Adipic acid ethylene glycol polyester and adipic acid diglycol polyester with hydroxyl numbers of 25 to 300. Polyethers which may be used include: polyethylene oxide, polypropylene oxide or polytetrahydrofurans with terminal hydroxyl groups of hydroxyl number 25 to 300. Acid anhydrides which may be used include: succinic acid anhydride, glutaric acid anhydride, maleic acid anhydride, phthalic acid anhydride, hexachloro-dimethylene-tetrahydrophthalic acid anhydride, hexahydrophthalic acid anhydride, 1:2:4-benzenetricarboxylic acid anhydride, naphthalic acid anhydride and adipic acid anhydride.

Other carboxylic acid components include polycarboxylic acids having molecular weights between 300 and 200,000, e.g. polyamides with carboxyl groups, such as polyamide carboxylic acids obtained from hexamethylene diamine and excess adipic acid, polycarboxylic acids obtained by polymerisation or copolymerisation of acrylic acid or maleic acid, semi-esters, or semi-amides, analogous derivatives of itaconic acid obtained by partial or complete saponification of high molecular weight compounds with ester-, amide-, cyclic anhydride- or nitrile groups, e.g. partially saponified polyacrylic acid methyl esters of molecular weight 400 to 10,000 and carboxyl numbers of 30 to 300.

Suitable acid components are, furthermore, polycondensation products of formaldehyde and phenolcarboxylic acids, such as salicyclic acid, p-hydrobenzoic acid, resorcinol carboxylic acid and mixtures of these compounds with phenols.

(2) In addition to compounds with free carboxyl groups there may also be used, as carboxylic acid components, carboxylic acid esters which split off alcohol or olefines under the reaction conditions, as well as anhydrides. Readily decomposable esters include for example, cyanic methyl ester, vinyl acetate, tertiary butyl acetate, α-alkoxy-alkyl ester and gem-diacyloxyalkanes. Examples of these are: Cyano-methyl butyrate and gem-diacetoxyethane. The same examples may be mentioned for the carboxylic acid anhydrides as those that were mentioned above for the preparation of polyester carboxylic acids from diols.

Carbonyl components (II) include both ketones and aldehydes. Both carbonyl compounds may contain one or more functional groups. They may be of low molecular weight or have a molecular weight between 300 and 200,000.

Examples of low molecular weight carbonyl compounds include: Formaldehyde, acetaldehyde, propionaldehyde, β-chloropropionaldehyde, acrolein, glycidic aldehyde, n- and iso-butyraldehyde, crotonaldehyde, aldol, hydroxypivalinic aldehyde, isohexyl aldehyde, acetone, methyl ethyl ketone, diethyl ketone, methyl vinyl ketone, acetoacetic ester, cyclohexanone, hydrocinnamic aldehyde, benzaldehyde, salicyclic aldehyde, 2:4-dichlorobenzaldehyde, acetophenone, benzophenone, glutaric dialdehyde, glyoxyl, methyl- and dimethylglyoxyl, benzil, acetylacetone, acetonylacetone, terephthalic dialdehyde, 1:3:5-triacetyl benzene and the disulphide of α-mercapto-isobutyraldehyde, polycarbonyl compounds obtainable from hydroxycarbonyl compounds such as glycolic aldehyde, aldol hydroxypivalinic aldehyde (dihydroxy-di-methyl-pivalinic aldehyde), diacetone alcohol, o- and hydroxybenzaldehyde, p-(β-hydroxy-ethoxyl)-benzaldehyde, vanillin or p-hydroxyacetophenone by esterification with carbonic acid (e.g. by phosgenating), carbaminic acid (e.g. by reaction with polyisocyanates) or with acids of phosphorus or polycarboxylic acids or by etherifying polycarbonyl compounds obtainable by alkylating compounds capable of being alkylated in several positions (e.g. 4:4'-dihydroxy-diphenyl-dimethylmethane) using halogencarbonyl compounds such as α-bromo-isobutyraldehyde or chloroacetone or α,β-unsaturated carbonyl compounds such as methyl vinyl ketone. In addition, there may be mentioned polycarbonyl compounds obtainable by rearrangement of polyepoxides such as di-(2:3-epoxy-1-propoxy)-p:p'-dihydroxydiphenyldimethylmethane.

Polycarbonyl compounds of high molecular weight may be obtained by polymerisation, polyaddition or polycondensation of carbonyl-containing monomers which contain functional groups that can be converted into carbonyl groups. Examples of such compounds are as follows:

Polyurethanes prepared by cocondensation of mono-, di- or polyhydroxycarbonyl compounds. The following hydroxycarbonyl compounds may be used: Aldol, glycerol aldehyde, hydroxypivalinic aldehyde, dihydroxymethylene-isovalinic aldehyde, and oxy- and dioxy-acetone as well as polyurethanes which are obtainable from polyisocyanates with carbonyl groups such as benzophenone-4:4'-diisocyanate; polymers or copolymers of acrolein or of methylvinyl ketone or vinyl benzaldehyde; copolymers of ethylene and carbon monoxide; polycarbonyl compounds obtainable by partial ozonisation (and subsequent reduction of the ozonide) of polymers of copolymers of styrene or 1:3-diolefines such as butadiene, isoprene and dimethylbutadiene.

Aliphatic, aromatic or heterocyclic mono- or polyisonitriles may be used as isonitrile components (III). The isonitrile components may be low molecular weight compounds or have a molecular weight of 300 to 200,000. Sterically hindered aliphatic and aromatic isonitriles have been found to be particularly suitable.

The following are particular examples of isonitrile components:

Ethyl-, allyl-, n- and tertiary butyl-, cyclohexyl-, cyclohexenyl-, benzyl-, phenyl-, o- and p-toluyl-, p-anisyl-, 2:4-, 2:5- and 2:6-xylyl-, 2:6-diethylphenyl-, 2:4:6-trichlorophenyl- and β-naphthylisocyanide, 5-methyl-5-iso-cyano-1:3-dioxan-2-one, di(2-methyl-2-isocyanic-1-propyl)-carbonate, 1:6-hexane-, 2-methyl-pentene-2:4-, α:α:α':α'-tetramethyl-p-xylylene-, 2:4-toluylene-, 1-methyl-3:5-diethyl-2:4-phenylene-, 1:5-naphthylene-, 4:4'-diphenyl methane-, 4:4'-diphenylene-, 3:3':5:5'-tetraethyl-diphenylurea-4:4'-, tri-(3:5-diethyl-4-isocyanophenyl)-methane-, 3:3'-dichloro-5:5'-dimethyl-4:4'-diphenylmethane-, 3:3'-dimethyl-5:5'-diethyl-4:4'-diphenylmethane-, 3:3':5:5'-tetraethyl-4:4'-diphenylmethane-diisocyanide and 4-α-isocyanoethyl-phenylisocyanide. In addition polyisonitriles obtained from simple isonitriles such as tertiary butyl isocyanide or cyclohexylisocyanate or mixtures of these with unsaturated hydrocarbons such as butadiene by radical linkage, for example by means of Fentons' reagents, as well as polyisonitriles obtained from hydroxyisonitriles by esterification and etherification with polyfunctional compounds as indicated for polycarbonyl compounds from hydroxycarbonyl compounds may also be used.

Polyisocyanides of molecular weights 300 to 200,000 obtained by known processes by a polymerisation, polyaddition and polycondensation from low molecular weight starting materials containing isocyanide groups include for example: Polyurethanes into which polyhydroxy-isocyanides such as 1-(β-hydroxyethylcarbamino)-2-methyl-2-isocyanic-propanol-(3) (obtainable from 2-methyl-2-formylamino-1:3-propanediol and phosgene in triethylamine followed by condensation with ethanolamine) have been incorporated by condensation, or copolymers of allylisocyanide or vinyl-phenylisocyanide and suitable monomers such as styrene or butadiene.

Addition components other than the above mentioned addition components I to III may however also be used as starting materials for the process of the invention.

For example, instead of using a certain compound with a certain functional group, it is possible to use a mixture of compounds which contain the same functional groups, for example several different carboxylic acids may be used instead of one particular carboxylic acid. It is thus possible to use mixtures of such components which have the same functional groups but a different reactivity. Such mixtures may be used if a precondensate is first prepared which is then condensed out at higher temperatures.

It is also possible to use addition components which contain several different functional groups in the molecule. Particularly suitable for this purpose are compounds which contain a carbonyl group in addition to a carboxyl group. Furthermore, carbonyl compounds which contain isonitrile groups may be used.

Examples of these have already been given in the list of the above mentioned addition components. Furthermore, keto acids such as laevulinic acid and aldehydic acids such as terephthalic aldehydic acid and α-isocyanic cyclohexanone may be used.

The components may be combined either in solution or without solvent. The following solvents may be used: Water or organic solvents, e.g. alcohols such as methanol, ethanol, n-butanol, methyl glycol, glycol, diglycol, esters such as ethyl acetate, glycol monomethyl ether acetate, ethyl acetoacetate, ethers such as diethylether, tetrahydrofuran, diglymes, dioxane, anisole, aldehydes and ketones which may, if desired, take part in the addition as carbonyl components (II), such as isobutyraldehyde, benzaldehyde, acetone, methyl ethyl ketone, methyl isobutylketone, methyl benzyl ketone, acetophenone, hydrocarbons, halogenated hydrocarbons and inert polar solvents such as nitrobenzene, pyridine, dimethylformamide or dimethylsulphoxide.

The polyaddition according to the invention may be carried out at low or elevated temperatures depending on the reactivity of the individual reaction components. The reaction temperatures generally lie between −20 and +200°, preferably between +10 and +150° although higher or lower temperatures may be used.

The polyaddition may be carried out by various methods.

The addition components may be dissolved together in a common solvent or they may be melted together or rolled together. In principle, it is not necessary to add reaction accelerators. However, compounds which have a catalytic action may be used (compounds of Mg, Zn, B, Al, Si, Ti or Sn which can form loose complexes with the components) e.g. boron fluoride etherate or dioctyl tin dilaurate or orthotitanic acid tetrabutyl ester. A slight acceleration of the reaction is thus obtained. In principle, however, the advantage of the polyaddition products according to the invention is that they do not contain any additives.

A preferred method of carrying out the polyaddition consists in preparing a preadduct which is removed by condensation in a second reaction stage. The preadduct is prepared by breaking off the addition by cooling or by adding one component in excess, namely about 0.2 to 0.8 mol in excess per mol of the other reactive groups, so that living polymers are obtained. Components containing groups of different reactivity or mixtures of components of different reactivity or functionality may also be used for preparing the preadduct. Removal by condensation is effected by suitably heating or by adding the missing reaction component.

The polyester amides according to the invention may be subsequently cross-linked by known process or vulcanised by means of sulphur, formaldehyde, hexamethylene tetramine or polyepoxides or resoles such as poly-o-hydroxymethylphenols, but peroxides such as dicumyl peroxide may also be used.

The same products may also be added at an earlier stage, during the polyaddition process. Cross-linking by additional reactions then occurs.

By using addition components which contain phosphoric ester groups or halogen such as fluorine, chlorine or bromine it is possible to produce polymers having reduced inflammability.

Auxiliary agents and additives such as stabilisers against light, oxygen, water and chemicals, dyestuffs and optical brightening agents, plasticisers and fillers may be added to the components before the addition or may subsequently be incorporated in the synthetic products. It is also possible to incorporate dyestuffs, optical brightening agents and stabilisers into the macromolecule in the process of polyaddition by way of the reactive carboxyl-, amino-, carbonyl- or isonitrile groups.

The polyaddition according to the invention may be carried out simultaneously with other polycondensations, polyadditions or polymerisations. The process according to the invention may be combined with isocyanate polyaddition to produce heat stable and chemically stable cross-linkages of predetermined constitution.

The polyaddition according to the invention may also be carried out simultaneously with the polycondensation of carboxylic acids, amines carbonyl compounds and isonitriles. In this polycondensation, a carboxylic acid component, an amine component, a carbonyl component and an isonitrile component are condensed together; at least two of the condensation components are bifunctional and at least one of the polyfunctional condensation components has a molecular weight between 300 and 200,000 and the molar ratios between carboxyl group, carbonyl group and isonitrile group deviate by less than 50% from the equimolar ratio. This polycondensation is generally carried out at temperatures between −20 and +200° (see also German patent specification application F 36,282). The condensation of the reaction according to the invention and of the above mentioned polycondensation then consists in carrying out a process similar to that used for the polycondensation but with a deficiency of amine component.

The process is also suitable for terminal cross linkings of synthetic materials which contain carboxyl-, primary, or secondary amino-, carbonyl- or isonitrile groups. The functional groups contained in the polymers are reacted in accordance with the invention. This produces a cross-linkage which is extremely stable to heat and which imparts additional strength to the structure by virtue of the hydrogen bonds.

The process according to the invention is also suitable for preparing foam plastics. The usual compounds that split off gas may be used as blowing agents. If desired, air may be stirred in or low boiling solvents such as petroleum ether may be added. The organic solvents are driven off by steam.

Emulsions of plastics such as polyvinyl chloride, polyacrylonitrile, polystyrene, phenolic resins or acetyl cellulose, in aqueous organic solutions of the addition components according to the invention are suitable for painting or coating textiles, leather and paper and for fixing dyestuffs. Polyaddition occurs and a durable film is obtained.

The products according to the invention are synthetic materials which may be worked up by the processes customarily used for synthetic materials such as elastomers, thermoplasts, casting masses, lacquers and adhesives.

The wide range in variation in starting materials provided by the three components makes it possible to produce different synthetic materials of very different types of properties, which may be used for a wide variety of purposes. It is possible to obtain products which are distinguished by their good thermal stability, their resistance to solvents and chemicals and oxygen and their good mechanical properties and the fact that they are easily worked up. In particular, materials that can be cast and injection moulded as well as moulding materials, elastomers and starting materials for fibres and foils may be obtained. A further advantages is that some of the products according to the invention are capable of being hardened by an after-treatment by heating.

The products obtained by the process may be used as lacquers, adhesives, gelatine substitutes, auxiliary agents for textiles, foam plastics, caulking compositions, coating agents and ionic exchangers.

The known reactions which are suitable for producing synthetic materials lead to products of low molecular weight if they do not proceed quantitatively or to macromolecules with unwanted side chains if the reactions are accompanied by cross linking. In both cases, the mechanical properties and chemical resistance of the products are impaired. This disadvantage is substantially avoided by the addition according to the invention if more than two of the addition components I to III are di- or polyfunctional.

*Example 1*

100 parts by weight of adipic acid-ethylene glycol polyester (OH number 53.5; acid number 1.63; molecular weight about 2000) are heated for 3 hours with 9.9 parts by weight of succinic acid anhydride at 125–135° to form an acid polyester which is intimately mixed, at 50 to 70° with 7.0 parts by weight of terephthalic dialdehyde and 10.0 parts by weight of 1-methyl-3:5-diethyl-2:4-phenylene-diisocyanide and then degasified in vacuo (about 1 mm. Hg). After heating for 24 hours at 60 to 80°, a pale brown elastic, temperature resistant synthetic material is obtained.

*Example 2*

44 parts by weight of an acid polyester according to Example 1 are mixed at 50 to 70° with 2.8 parts by weight of terephthalic dialdehyde, 1.0 part by weight of 2:4-toluylene diisocyanate and 6.7 parts by weight of 3:3':5:5' - tetraethyldiphenylmethane - 4:4'-diisocyanide and degasified in vacuo. The product is heated for 24 hours at 60 to 80° to produce an elastic cross linked synthetic material of good temperature resistance and strength.

*Example 3*

50 parts by weight of a polyester of adipic acid and ethylene glycol (OH number 53.5; acid number 1.63; molecular weight about 2000) are reacted for 6 hours at 125 to 135° with 9.6 parts by weight of 1:2:4-benzene-tricarboxylic acid anhydride to produce an acid polyester. 24 parts by weight of this acid polyester are mixed at 50 to 70° with 40 parts by weight of the first mentioned polyester with terminal hydroxyl groups and 6.0 parts by weight of hydroxypivalinic aldehyde. The liquid mixture of 4.0 parts by weight of 1-methyl-3:5-diethyl-2:4-phenylene-diisocyanide and 13.0 parts by weight of 4:4'-diphenyl-methanediisocyanate is then stirred in. This viscous liquid, which contains fine gas bubbles is heated at 100 to 120° to produce an elastic foam plastic of high tear strength and temperature resistance.

The isocyanides used in the following examples are denoted as A, B and C:

A. 3,3', 5,5'-tetraethyl - 4,4'-diphenylmethane-diisocyanide
B. 1,4-cyclohexane-diisocyanide
C. a mixture of:

| | Percent |
|---|---|
| 1-methyl-3,5-diethyl-2,4-phenylene-diisocyanide | 40 |
| 1-methyl-3,5-diethyl-2,6-phenylene-diisocyanide | 60 |

*Example 4*

100 parts of a copolymer of 93 parts of methylmethacrylate and 7 pyarts of acrylic acid are dissolved in 100 parts of ethyl acetate. After addition of 16 parts of isonitrile A and 14 parts of cyclohexanone, the mixture was stirred as long as a homogeneous solution has been formed. A film was cast from this solution and subsequently heated to 130° C. for 40 minutes. The so-treated film is insoluble in ethyl acetate.

*Example 5*

The process as well as the components of Example 4 were used, however, instead of isonitrile A 6.7 parts of isonitrile B were applied.

*Example 6*

The process as well as the components of Example 4 were used, however, instead of isonitrile A 9.8 parts of isonitrile C were applied.

*Example 7*

The components as well as the process as applied in Example 6 were used, however, besides isonitrile mixture C an amount of 6 parts of acetone were added and the obtained polymer film was heated to 120° C. for 20 minutes. Thereafter, the film is insoluble in ethyl acetate.

*Example 8*

7 parts of isonitrile B and 15 parts of benzophenone are dissolved in 200 parts of a 50% solution of a copolymer of

| | Parts |
|---|---|
| Cyclohexylmethacrylate | 80 |
| Dodecylmethacrylate | 22 |
| Methacrylic acid | 8 | in white spirit.

A film is cast from this solution and after drying heated to 150° C. for 30 minutes. The so-obtained film is insoluble in white spirit.

*Example 9*

The process of Example 8 is followed and also the components of said example were applied, however, the benzophenone is substituted by 15 parts of heptyl aldehyde.

*Example 10*

Process and components as applied in Example 9 were used, however, instead of isonitrile B 10 parts of an isonitrile mixture C were applied.

*Example 11*

100 parts of a copolymer of

| | Parts |
|---|---|
| Acrylonitrile | 20 |
| Butadiene | 72 |
| Methacrylic acid | 8 | obtained by polymerisation in emulsion and being soluble in dimethyl formamide were intimately mixed on a kneader at 50° C. with 6.7 parts of isonitrile B and 8 parts of acetophenone. A sheet was formed from this mixture and annealed at 120° C. during 44 minutes. Thereafter, this material is insoluble in dimethyl formamide, resp. is only slightly swollen on the surface.

*Example 12*

900 parts of a copolymer of

| | Parts |
|---|---|
| Acrylic acid | 10 |
| Acrylonitrile | 90 | were dissolved with 8 parts of isonitrile B and 20 parts of cyclohexanone in dimethyl formamide. This solution was pressed through a nozzle into a water bath. The so-obtained fibrous material is insoluble in dimethyl formamide after a heating period of 15 minutes at 110° C.

*Example 13*

The components of Example 12 were used and the same process was applied, but 5 parts of benzhydrazide were admixed in addition to the components of Example 12. The discolouration of the cross-linked material is considerably lower.

Example 14

100 parts of a copolymer of

| | Parts |
|---|---|
| Acrylic Acid | 8 |
| Vinylacetate | 25 |
| Vinylchloride | 67 | and 10 parts of isonitrile C and 10 parts of isobutyraldehyde were dissolved in tetrahydrofurane. A film was cast from this solution. After a heating period of 20 minutes at 100° C. the so-obtained film is insoluble in tetrahydrofurane.

Example 15

100 parts of a copolymer of

| | Parts |
|---|---|
| Acrylic acid | 20 |
| Vinylacetate | 80 | were dissolved with a mixture of 70% methanol and 30% acetone and were mixed with 15 parts of isonitrile C as well as 15 parts of benzaldehyde. A film was cast from this solution and is insoluble in acetone either after a heating period of 1 minute at 150° C. or a heating period of 20 minutes at 100° C.

Example 16

100 parts of a copolymer obtained by saponification of the ethylene vinylacetate copolymer having a hydroxyl group content of 9.2% were dissolved with 500 ml. tetrahydrofurane and refluxed for 24 hours with 50 parts of succinic acid anhydride. The polymer was precipitated by adding of water, washed and dried. The dried polymer was dissolved in tetrahydrofurane and mixed with 10 parts of isonitrile B and 10 parts of cyclohexanone. A film was cast from the so-obtained clear solution and heated for 45 minutes to 120° C. The film is insoluble in tetrahydrofurane.

Example 17

300 parts of an emulsion (having a 30% solids-content) of a copolymer of

| | Parts |
|---|---|
| Styrene | 66 |
| Methacrylic acid | 9 |
| Acrylic acid butylester | 25 | were mixed by stirring with 13 parts of isonitrile mixture C and 50 parts of a 10% solution of formaldehyde in water. A film was cast from this emulsion and after drying heated to 120° C. for 40 minutes. Thereafter, the film is insoluble in ethyl acetate.

Example 18

A process of Example 17 is repeated, but in addition to the components used in said example, 8 parts of cyclohexanone were stirred into the emulsion.

Example 19

200 parts of an emulsion (having a 50% solids-content) of a copolymer of

| | Parts |
|---|---|
| Vinylacetate | 50 |
| Acrylamide | 40 |
| Acrylic acid | 10 | were mixed by stirring with 15 parts of isonitrile C and 25 parts of dioxane as well as a 20% aqueous glutardialdehyde solution. Thereafter a film was cast from the cream-like emulsion and after drying heated to 110° C. The so-obtained film is insoluble in water, acetone or methanol.

Example 20

100 parts of a copolymer of

| | Parts |
|---|---|
| Acrylic acid | 10 |
| Methacrylic acid oxypropylester | 10 |
| Acrylic acid ethylester | 80 | were dissolved in ethyl acetate with 18 parts of isonitrile A and 20 parts of cinnamic aldehyde. A film was cast from this solution and heated to 120° C. for 25 minutes. Thereafter, the film is insoluble in ethyl acetate.

Example 21

100 parts of alternating copolymer of isoprene and maleic acid-cyclohexyl semi-ester, 20 parts of isonitrile mixture C and 20 parts of cyclohexanone were dissolved in tetrahydrofurane. A film was cast from this solution and heated to 120° C. for 40 minutes. Thereafter the film is insoluble in tetrahydrofurane.

Example 22

The process and the components are applied as in Example 21, however, instead of the isonitrile C 25 parts of isonitrile B are used.

Example 23

100 parts of a copolymer of

| | Parts |
|---|---|
| Vinyliden chloride | 30 |
| Methacrylic acid methylester | 60 |
| Methacrylic acid | 10 | were dissolved in glycolmonomethylether acetate with 9 parts of isonitrile B as well as 10 parts of ethyl amylketone. A film was cast from this solution and heated to 100° C. for 180 minutes and is insoluble in glycolmonoethyl ether acetate.

Example 24

218 parts of pyromellitic acid anhydride and 2000 parts of the polyester of adipic acid-ethylene glycol, said polyester having a hydroxyl number of 56, were reacted while stirring for 8 hours at 125–135° C. After cooling to 20° C. the reaction product was intimately mixed with 330 parts of 3,3',5,5'-tetraethyl-diphenyl-methane-4,4'-diisocyanide and 100 parts of benzophenone on a roller. The elastic cross-linked plastic is obtained by heating this mixture 4–12 hours at a temperature between 110–130° C.

Example 25

192 parts of 1,2,4-benzene-tricarboxylic acid anhydride were reacted with 567 parts of an esterification product of linseed oil with trimethylolpropane (obtained in known manner, having a hydroxyl number of 99) by heating for 45 hours at 130° C. The so-obtained precondensate was mixed with 134 parts of 1,4 hexane-diisocyanide and 155 parts of cyclohexanone as well as 3 parts of manganenaphthenate. The reaction product represents a lacquer which sets at 20–120° C.

Example 26

5 parts of isonitrile mixture C were dissolved in 100 parts of a 40% solution of a copolymer of

| | Parts |
|---|---|
| Styrene | 260 |
| Acrylic acid butylester | 200 |
| Acrylic acid | 40 | in ethyl acetate. The so-obtained isonitrile containing reaction mixture remains uncrosslinked even after storing for 20 days at 15° C. After said 20 days of storage 10 parts of cyclohexanone were admixed, a film was cast and after evaporating of the solvent heated for 15 minutes at 100° C. Thereafter, the film is insoluble in ethyl acetate.

Example 27

Repeating the process of Example 26, however, using additionally 5 parts of hydrazine yields a film which shows considerably lower discolouration.

Example 28

Instead of a copolymer used in Example 26 another copolymer of

| | Parts |
|---|---|
| Styrene | 260 |
| Acrylic acid butylester | 200 |
| Methacrylic acid | 40 | was applied. The other components were used as described in Example 26. When following the process of this Example 26 one can obtain a film which is completely insoluble in ethyl acetate.

*Example 29*

30 parts of a 40% solution of a copolymer of

| | Parts |
|---|---|
| Methacrylic acid dodecylester | 320 |
| Styrene | 363 |
| Methacrylic acid | 60 | were mixed in a solvent mixture of 70 parts of white spirit and 30 parts of methylethyl ketone with 0.95 part of isonitrile B and 7 parts of cyclohexanone. Thereafter, a film was cast from the homogeneous solution. The solvent was evaporated at room temperature and after a storage of 40 hours at 23° C. the film is insoluble in the originally used solvent mixture.

*Example 30*

A mixture of trifunctional isonitriles was prepared by the Passerini-reaction using

| | Mols |
|---|---|
| Citric acid | 1 |
| Isonitrile mixture C | 3 |
| Cyclohexanone | 3 |

These components were reacted in a 7% methanolic solution by keeping for 20 hours at 45° C. 11.2 parts of the aforesaid mixture of trifunctional isonitriles were dissolved in 30 parts of a 40% solution in white spirit of a copolymer of

| | Parts |
|---|---|
| Methacrylic acid dodecylester | 330 |
| Styrene | 353 |
| Methacrylic acid | 60 |

A film was cast after adding 5 parts of cyclohexanone to this mixture. The so-obtained film is insoluble in benzene, ethyl acetate or glycol monoethyl ether acetate after heating for 30 minutes to 140° C.

*Example 31*

Process and components were used as in Example 30, however, as isonitrile the isonitrile A (2 parts) were applied.

*Example 32*

Process and components were used as in Example 30, however, as isonitrile 1.38 parts of isonitrile C were applied besides 3 parts of stearyl amine were dissolved in the mixture of the crosslinking substances. The crosslinked film is only weakly discoloured and is insoluble in benzene or ethyl acetate.

*Example 33*

10 parts of the solution of copolymer of

| | Parts |
|---|---|
| Acrylic acid | 64 |
| Styrene | 51 |
| Acrylic acid butylester | 52 |
| Acrylonitrile | 102 | in a mixture of

| | Parts |
|---|---|
| Ethyl acetate | 150 |
| Acetone | 150 | were mixed with one part of isonitrile mixture C and 2 parts of cyclohexanone. A film was cast from the so-obtained clear solution on an iron sheet and dried under air at room temperature. After a drying period of 5 hours this film is only slightly swollen on the surface when exposed to ethyl acetate. Another film was stored for 5 minutes at 120° C. and shows therefore excellent adhesion to the metal sheet and is swelling resistant towards ethyl acetate.

*Example 34*

176 parts of a copolymer of

| | Parts |
|---|---|
| Acrylic acid | 72 |
| Styrene | 104 | were dissolved in 100 parts of acetone. 109 parts of cyclohexyl isonitrile and 120 parts of cyclohexanone were added to the solution. A film was cast from this solution and crosslinked by heating to 80° C. for 1 hour. Thereafter the film is insoluble in acetone.

We claim:

1. Process for preparing polyester amides which comprises reacting at temperatures between −20 and +200° C. (a) a carboxyl group containing polymer having a molecular weight of between 300 and 200,000 and having a carboxyl group content of from 1 to 20% by weight, with (b) an isonitrile of at least 7 carbon atoms and having at least one isonitrile group, and with (c) a carbonyl group containing component selected from the group consisting of aldehydes and ketones, at least two of the addition components (a), (b) and (c) being bifunctional with respect to the defined functional groups.

2. Process according to claim 1, wherein said carboxyl group containing polymer component (a), said isonitrile component (b) and said carbonyl component (c) are applied in molar ratios between carboxyl groups, carbonyl group and isonitrile group deviating by less than 50% from the equimolar amount.

3. A process as claimed in claim 1 wherein said isonitrile component (b) represents a member selected from the group consisting of monocyclic aromatic diisonitriles, diisonitriles of diphenyl alkanes, cycloaliphatic mono-isonitriles having 5–6 carbon atoms, cycloaliphatic diisonitriles having 5–6 carbon atoms and diisonitriles of aliphatic saturated hydrocarbons having 2–10 carbon atoms, and wherein said carbonyl group containing component (c) represents a member selected from the group consisting of an aliphatic saturated mono-ketone having between 3–10 carbon atoms, a saturated aliphatic-aromatic mono-ketone having at least 8 carbon atoms, an aromatic-aromatic mono-ketone and a cyclo-aliphatic mono-ketone having at least 5 carbon atoms.

4. A process as claimed in claim 1 wherein said isonitrile component (b) represents a member selected from the group consisting of monocyclic aromatic diisonitriles, diisonitriles of diphenyl alkanes, cycloaliphatic mono-isonitriles having 5–6 carbon atoms, cycloaliphatic diisonitrile having 5–6 carbon atoms and diisonitriles of aliphatic saturated hydrocarbons having 1–10 carbon atoms, and wherein said carbonyl group containing component (c) is represented by a member selected from the group consisting of a saturated aliphatic aldehyde having from 1–12 carbon atoms and a monocyclic aromatic aldehyde containing at least one aldehyde grouping.

5. A process as claimed in claim 1 which comprises applying as isonitrile component a polyfunctional isonitrile in which the isonitrile groups are attached to the tertiary aliphatic carbon atom.

6. A polyesteramide as obtained by the process of claim 1.

7. A polyesteramide as obtained by the process of claim 3.

8. A polyesteramide as obtained by the process of claim 4.

References Cited by the Examiner

UNITED STATES PATENTS 2,455,983  12/1948  Dreyfus _____ 260—78

MURRAY TILLMAN *Primary Examiner.*

P. LIEBERMAN, *Assistant Examiner.*